Figure 1:
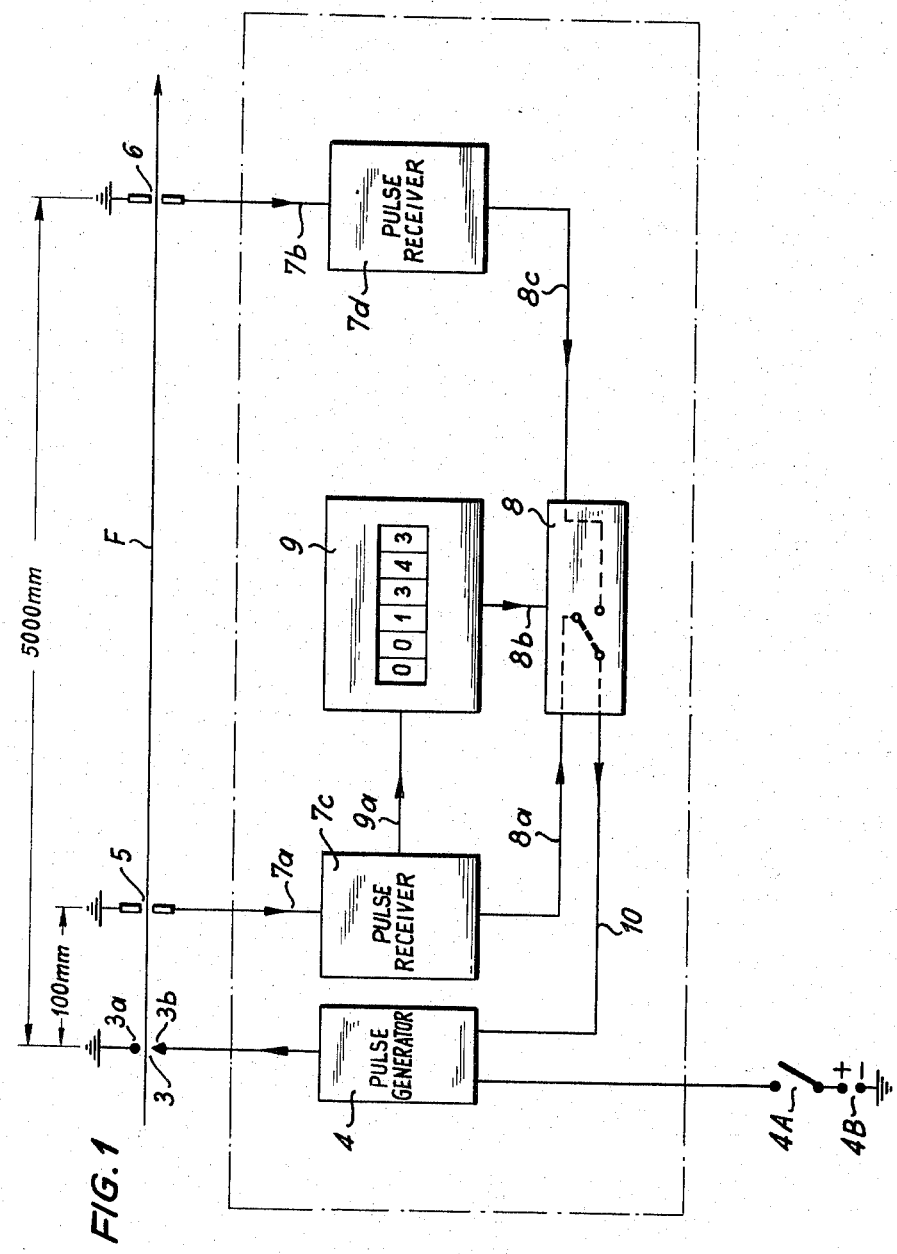

April 18, 1967 W. GITH 3,315,159
METHOD AND SYSTEM FOR MEASURING THE LENGTH OF
RUNNING TEXTILE FILAMENTS
Filed July 9, 1964 3 Sheets-Sheet 1

United States Patent Office 3,315,159
Patented Apr. 18, 1967

3,315,159
METHOD AND SYSTEM FOR MEASURING THE LENGTH OF RUNNING TEXTILE FILAMENTS
Walter Gith, Monchen-Gladbach, Germany, assignor to Walter Reiners, Monchen-Gladbach, Germany
Filed July 9, 1964, Ser. No. 381,341
Claims priority, application Germany, July 18, 1963, R 35,694
6 Claims. (Cl. 324—71)

My invention relates to method and system for measuring the length of running flexible textile elements such as filaments, yarns, threads and webs or the like, and more particularly to such method and system which employs automatically vanishing or fugitive markings or indices that are applied to the flexible element at the beginning of a predetermined measured distance when the preceding index has reached the end of the measured distance.

In my copending application Ser. No. 293,004, filed July 5, 1963, I have described method and apparatus for measuring the length of running textile threads which provides for applying automatically vanishing marks to the thread at the beginning of a predetermined measured length when a preceding mark has reached the end of the measured length. The number of marks are then counted. An undesirable characteristic of such a measurement method and apparatus is that repeated changes in the speed of the thread or stoppage of the thread can cause a measurement error. If the machine, for example, is turned on for very slow motion of the thread, i.e. threading or creeping speed, or is temporarily stopped, the fugitive markings which consist either of ionized portions of the thread, applied radioactive isotopes of short half life or watermarks for example, automatically start to shrink in length. Thus, the pertinent front or leading edges of the marks are registered at the receiver at a displaced location due to the shrinking of the marks even if only by fractions of a millimeter. A further possibility of error is caused by the fact that the marks cannot be applied inertialessly, so that the yarn is stretched even if ever so slightly, and the marks from the very beginning are located more or less incorrectly. All of these errors are contingent mainly on the speed of the moving thread and can be reduced to a minimum when the marks are applied with the greatest possible spacing therebetween. In such a case, however, for each thread break, rather long end lengths of thread that cannot be measured due to the large spacing between succeeding marks, are produced. If the spacings between the markings are kept small, on the other hand, the errors will then be proportionately too great due to the cumulative effect of the resulting large number of even minute errors for each marking. In order to prevent these errors, I have suggested in my aforementioned copending application to vary the distance between the markings in relation to the travel speed of the material that is being measured.

Objects of my invention are to readily afford measuring the length of running textile thread material at a much higher degree of accuracy and reliability than in the known measuring systems or by the known measuring methods and to provide an improvement over the system and method of measurement disclosed in my aforementioned copending application.

With these objects in view and in accordance with my invention, I provide method and system for measuring the length of running flexible textile elements which comprises applying to the textile element the first marking of a group of markings of predetermined number after a previous group of similar markings when the first marking of the preceding group has reached the end of a measured distance whose length is increased by a suitable multiple of the number of markings of one group.

In carrying out the method of this invention, let us assume that the first measuring distance is 10 cm. away from a first marking position, the second measuring position on the other hand being 5 meters away. The length of the second measuring distance to the second measuring position is consequently fifty times as great as the length of the first measuring distance. In accordance with my invention, after a group of markings of predetermined number, fifty in the case of the foregoing example, the first marking of the next following group, that is the fifty-first marking, is then applied to the textile element or thread for example, when the first marking of the preceding group of fifty has reached the end of the larger measuring distance, because the larger measuring distance is, with respect to the fifty impulses of a group, fifty times as large as the smaller measuring distance which is between impulses. In the aforedescribed method of my aforementioned copending application, the variations in the spacing between the markings that are dependent upon the travel speed of the thread are short and long spacings between the markings applied one after the other. On the other hand, the spacing between the markings of the invention in this application is constant and always corresponds to the length of the short measuring distance. However, in order to prevent the abovementioned disadvantages of the shorter measuring distances at the same time as those of the longer measuring distances, so-called correction markings are applied. Thus, over a long period of time the errors correspond only to the proportionately much smaller errors of the larger measuring distance.

According to another feature of my invention and in order to carry out the aforementioned method, I provide a system which comprises a marking device and at least two pulse receivers that are connected by a switch and that are located at predetermined distances from the marking device and which produce new markings with the marking device, the receiver lying closest to the marking device being connected with a counting mechanism actuated at the same time as the switch. Thus, whenever a marking group is counted, the switch is actuated by the counting mechanism so that the first marking of the next group is not brought about by a signal from the first receiver which counts the markings but rather from the correcting second receiver. As soon as a correction marking is produced by the marking device due to stimulation by the second receiver, the switch connects the marking device again with the first receiver so that thereafter markings can be applied with the spacing corresponding to the short measuring distances.

Other features which are considered as characteristic for the invention are set forth in the appended claims.

Although the invention has been illustrated and described as method and system for measuring the length of running textile filaments, it is nevertheless not intended to be limited to the details shown, since various modifications may be made herein without departing from the spirit of the invention and within the scope and range of equivalent of the claims.

The construction and method of operation of the invention, however, together with additional objects and advantages thereof, will be best understood from the following description when read in connection with the accompanying drawings, in which:

FIG. 1 is a schematic block diagram of the system.

Figure 2:
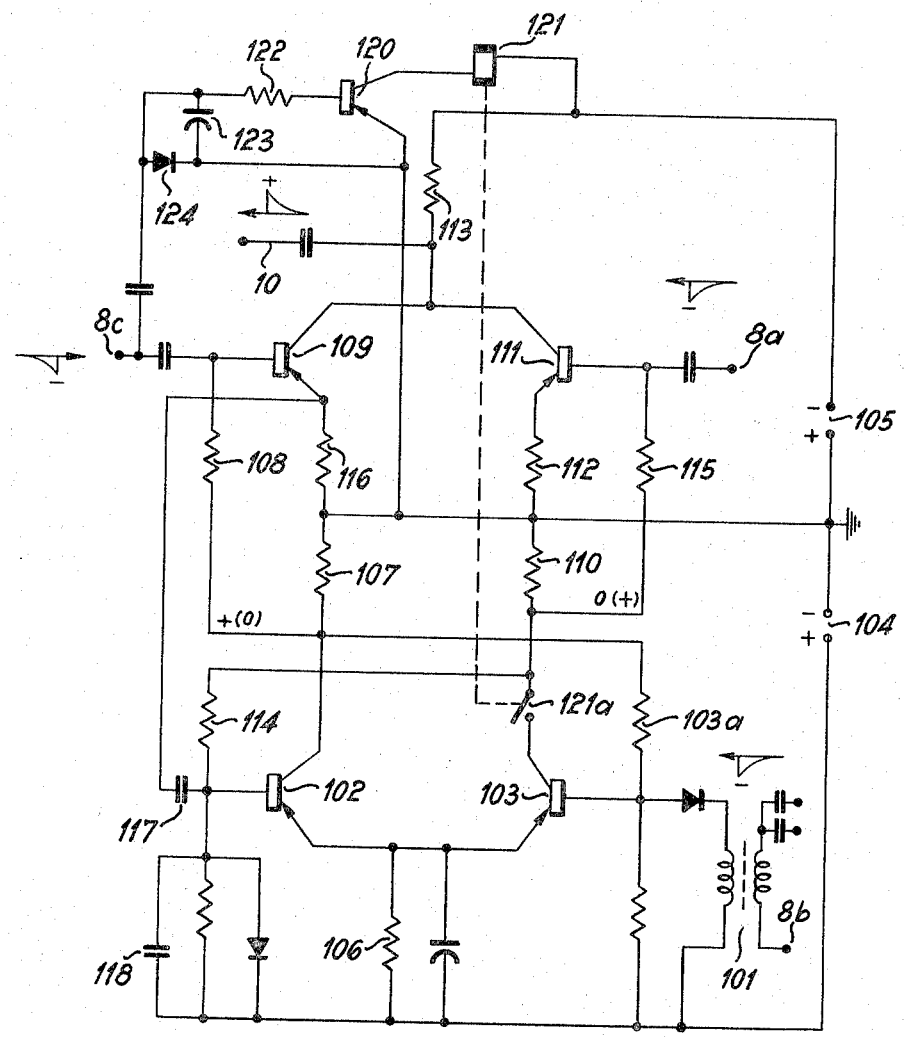

FIG. 2 exemplifies a circuit diagram of a selected switching stage which forms a part of the apparatus shown in FIG. 1.

Figure 3:
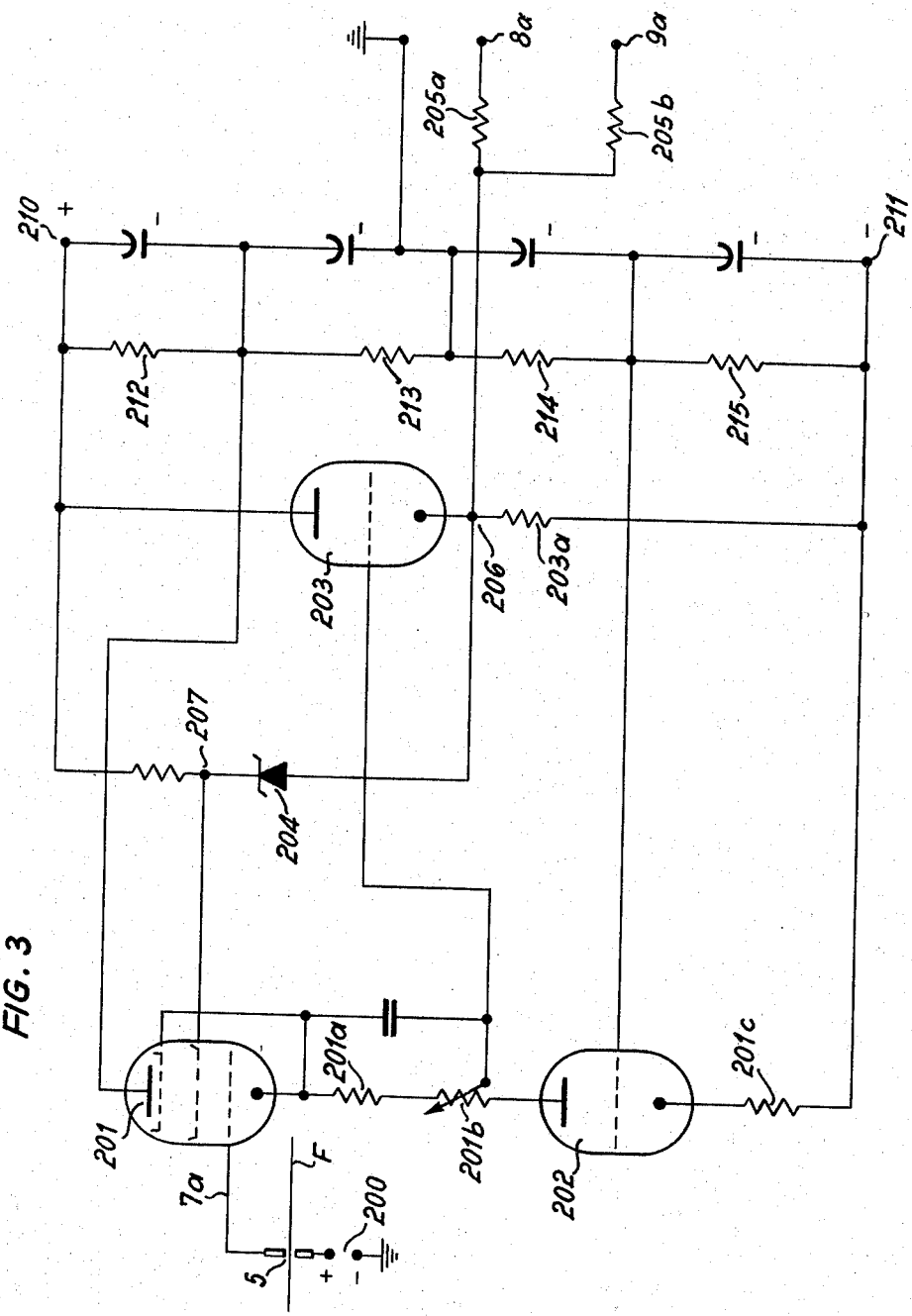

FIG. 3 is a schematic circuit diagram of a pulse receiver forming part of my invention.

The same reference characters are used in all the figures for the same components respectively.

Referring now to the drawings and particularly to FIG. 1 thereof, there is shown schematically a length measuring apparatus which applies discrete marks on a flexible textile element such as the thread F in the form of ionization of the thread at the respective locations. As has been noted above, instead of ionization, other automatically shrinking marks, such as are produced by atomized water, by radioactive isotopes of short duration or the like, can be used. As the thread F whose length is to be measured travels in the direction of the associated arrow, the measurement distance begins at the marking device 3, which consists of two electrodes 3a, 3b, of which the electrode 3a is connected to ground and the other electrode 3b is connected to a high-voltage pulse generator 4. One of the electrodes 3b is pointed and directed toward the thread F to produce an electric corona-type discharge that ionizes the air in the immediate environment and also a spot on the thread located at that moment between the two electrodes. The pulse generator 4 can be for example a conventional video pulse generator such as is employed in television receivers in connection with a high-voltage rectifier from which the ionizing pulses are applied to the discharge gap between the electrodes 3a and 3b. However, other commercially available high-voltage D.C. pulse generators are likewise applicable such as a shock-excited oscillator with a rectifier for furnishing a one-shot pulse for each trigger signal. In practice, direct voltages of approximately 10 kilovolts have been found satisfactory, although high voltages, for example 20 kv. to 100 kv., are likewise well suited. The results have been found to be independent of the type of particular textile material of the filament, thread or web being measured.

A system of the illustrated type is preferably employed in conjunction with a textile fabricating machine, such as a warp beam loom or a yarn-package winding machine or the like. When the machine is turned on, the thread F is drawn toward the machine and the main switch 4A of the measuring apparatus is simultaneously closed. The pulse generator 4 is then energized from the terminals 4B of a current supply and passes a short high-voltage pulse to the electrode 3b of the marking device 3. The travelling thread 1 is consequently ionized locally at the position which just passes between the electrodes 3a, 3b at the instant that the high-voltage pulse passes between the electrodes. The electrically polarized or charged spot on the thread F travels with the thread sequentially through the read-out locations at the sensors 5 and 6. Each of these sensors comprise two metal plates between which the thread F passes without touching either plate. As soon as the ionized mark passes between the two metal plates at a sensing location, an ionized and conducting air bridge is formed between the plates so that an appertaining control circuit is closed. Consequently, a control pulse occurs in the respective control circuit which is passed through the conductors 7a and 7b respectively to electrometer stages or pulse receivers 7c and 7d respectively. Thus, a pulse is passed from the electrometer stage 7c of the sensor 5 through the conductor 9a to a counting mechanism 9. The pulse that is received by the electrometer stage 7c simultaneously passes through the conductor 8a and the switch 8 as well as the conductor 10 to the high-voltage pulse generator 4 where it releases another high-voltage that causes the marking device 3 to place a new ionization spot on the running thread. Thus, each of the markings by the high-voltage pulse generator 4 on the thread F is sensed by the sensor 5 and serves both to actuate the counting mechanism 9 and to apply a new mark through the marking device 3.

In the illustrated example, the sensor 5 is assumed to be spaced 10 cm. (100 mm.) from the marking device 3 while the sensor 6 is located 5 m. (5000 mm.) therefrom. The sensor 6 is consequently fifty times as far from the marking device 3 as is the sensor 5. After each fifty markings, the fifty-first marking is not controlled by the sensor 5 but rather by the sensor 6. Consequently, after each fifty markings the switch 8 must be so actuated that the control impulses conducted by the conductor 10 to the high-voltage pulse generator 4 do not come through the conductor 8a from the electrometer stage 7c but rather through the conductor 8c from the electrometer 7d. For this purpose, the switch 8 is controllable by the counter 9 through the conductor 8b. The counter 9, which can for example have two electronic and four electromagnetic counter decades, passes a control pulse over the lead conductor 8b to the switch 8 for each fifth and tenth step of its second or tens decade, that is, for each group of fifty unit steps or a multiple thereof. The switch 8 then interconnects the leads 10 and 8c. After a control pulse is passed through the lead 8c, the switch 8 and the lead 10 to the high-voltage pulse generator 4 from the sensor 6, the switch 8 is again automatically switched back to the position shown in FIG. 1, so that all further pulses are again passed from the electrometer stage 7c through the lead 8a, the switch 8 and the lead 10 to the high-voltage pulse generator 4.

Both of the pulse receivers or electrometer stages 7c, 7d are of similar construction. FIG. 3 shows schematically the circuit diagram of the electrometer stage 7c connected to the sensor 5 and having two outlets, one of which is connected through a resistor 205a to the lead 8a and the other of which is connected through a resistor 205b to the lead 9a. The electrometer stage 7d differs only from the stage 7c illustrated in FIG. 3 in that it is connected through the sensor 6 and has only one outlet which is connected through a resistor 205a to the lead 8c and has no direct connection with the counter mechanism 9. In FIG. 3 there is also shown a current source 200 which provides suitable voltage for the electrometer stage 7c. A similar voltage source is provided for the electrometer stage 7d.

The electrometer stages or pulse receivers 7c, 7d proper consist of an electrometer tube 201 connected as a cathode follower, having a cathode resistance consisting of four component resistances 201a, 201b, 201c and 202. The fourth component, resistance 202, is an electronic tube.

The resistance 201b is provided with an adjustable tap by means of which the operating point for the third tube 203 can be regulated. The tube 203 is also connected in a cathode follower circuit; however, it is provided with only a single cathode resistance 203a. In addition, the screen grid of the electrometer tube 201 is connected with the cathode of the tube 203 through a Zener diode 204, located between points 206 and 207, which serves to stabilize the electrometer tube 201.

A voltage is supplied across the input terminals 210 and 211 with the polarity shown by the plus and minus signs, and has a value, for example, of about 300 volts. Four resistors 212 to 215, serially connected across the terminals 210 and 211, divide the voltage into four relatively equal amounts.

The operation of the electrometer stages is as follows: When an ionized spot located on the thread F reaches the sensor 5 or 6 as the case may be, a pulse is passed over the lead 7a or 7b respectively to the tube 201. Since the tube 201 is connected as a cathode follower, the pulse is amplified in the cathode circuit, is tapped off at the resistance 201b and is passed to the control grid of the tube 203. The pulse is then taken off the cathode of the tube 203 at the point 206 and is passed to the output leads 8a and 9a in the case of the pulse receiver 7c or only to the output lead 8c in the case of the pulse receiver 7d. The outlet terminals are galvanically uncoupled by the resistors 205a and 205b.

The switch 8 according to my invention is an electronic switch controlled by a bistable flip-flop circuit as shown schematically in FIG. 2. In the upper part of FIG. 2 are shown the connections to both leads 8a and 8c coming from the electrometer stages 7c and 7d respectively and which pass pulses through the switch and the lead 10 to the high-voltage pulse generator 4. The switch is controlled by the counter mechanism 9 through the lead 8b which is connected with the transformer 101.

The bistable flip-flop circuit includes the two transistors 102 and 103. Transistor 102 is normally conducting so that current from the current source 104 flows through the resistance 106, the transistor 102, the resistance 107, and back to the source 104. The voltage drop across the resistance 107 produces through the resistance 103a a positive voltage at the base of the transistor 103 so that the transistor is non-conducting. In addition, due to the voltage drop across the resistance 107, a more positive voltage is applied through the resistance 108 to the base of the transistor 109. Transistor 109 is also thereby closed so that the negative pulses arriving through the lead 8c, i.e. from the electrometer stage 7c and thereby from the sensor 6, cannot open the transistor 109.

Because, on the other hand, the transistor 103 is closed, i.e. is non-conducting, no voltage drop takes place across the resistance 110. The base of the transistor 111 is accordingly at ground potential through the resistance 115, so that the negative impulse coming through the lead 8a from the electrometer stage 7c and thereby from the sensor 5, can open this transistor 111 respectively for a short time. Each time the transistor 111 is opened by a negative pulse coming from the lead 8a, current from the current source 105 flows through the resistance 112, the transistor 111 and the resistance 113 and back to the current source 105. The voltage drop occurring across the resistance 113 is then passed through the lead 10 as a positive pulse to the high-voltage pulse generator 4.

As aforementioned, for every fiftieth, one-hundredth, one hundred-fiftieth, etc. pulse, a positive pulse is conducted from the counter mechanism 9 through the lead 8b, is inverted by the transformer 101, and is passed as a negative pulse to the base of the transistor 103. The transistor 103 thereby becomes conducting so that the circuit of the current source 104, the resistance 106, the transistor 103 and the resistance 110 is closed. In that event it can be assumed that the hereinafter described switch 121a is closed. The voltage drop across the resistance 110 raises the potential between the resistance 110 and the transistor 103 from ground potential to a positive value which is applied through the resistance 114 to the base of the transistor 102 so that the transistor 102 becomes closed or non-conducting. The positive voltage in the lead between the resistance 110 and the transistor 103 is simultaneously passed through the resistance 115 connected with the base of the transistor 111 so that this base becomes so highly positively biased that the pulse passing through the lead 8a can no longer open this transistor. Since the closing of the transistor 102 simultaneously prevents any further voltage drop from taking place across the resistance 107, the potential in the lead between the resistor 107 and the transistor 102 is restored to ground potential from a positive voltage so that no positive bias is present at the base of the transistor 109. The transistor 109 is thus ready to be switched on. A negative pulse coming from the sensor 6 through the electrometer stage 7d and the lead 8c switches the transistor 109 on as soon as the next spot on the thread F reaches the sensor 6. The transistor 109 is thus opened or becomes conducting so that a circuit is closed from the current source 105 through the resistance 116, the emitter and the collector of the transistor 109, as well as the resistance 113 and back to the current source 105. The pulse passing through the lead 8c thus also causes a pulse-like voltage drop across the resistance 113, since the transistor 109 naturally is open only as long as the pulse is present in the lead 8c. As aforedescribed, a positive pulse is then tapped off the resistance 113 and passed through the lead 10 to the high-voltage pulse generator 4.

When the transistor 109 is opened, because of the current flow through the resistance 116, a negative pulse occurs in the lead connected between the resistance 116 and the emitter of the transistor 109 and passes through the condenser 117 to the base of the transistor 102. This negative pulse opens the transistor 102 so that once again a voltage drop occurs across the resistor 107, which consequently closes the transistor 103. The initial conditions are thus reached once again, that is, the transistor 109 receives such a highly positive bias that the pulse passing through the lead 8c cannot open this transistor while the base of the transistor 111 lies at ground potential, so that the negative impulses passing through the lead 8a cause the transistor 111 to open.

In order to prevent the switching of the bistable multivibrator consisting of the two transistors 102 and 103 from being prematurely initiated by the negative pulse passing through the capacitor 117 before the voltage drop applied across the resistance 113 can completely form, that is, before the entire positive pulse is passed through the lead 10 to the high-voltage pulse generator, the opening of the transistor 102 is delayed since the pulse first of all charges the capacitor 118. The transistor 109 must thus only transmit a very exact measurement pulse of the measuring sensor 6 while all other pulses are again transmitted by the transistor 111.

If the thread winding or other textile machine employed in conjunction with my invention is equipped with a creep or slow-motion drive mechanism because of which the spots applied to the thread F under the proper conditions do not reach the sensor 6 due to the fact that they have faded or vanished in the interim, the counter mechanism 9 must be prevented from actuating the switch 8 since otherwise no new spots or markings could be applied to the thread F. In accordance with a further feature of my invention, it is therefore advantageous to effect the actuation of the switch 8 with a locking device that is controllable by the more distant sensor. This locking device consists of a secondary switch which interrupts the exciter circuit of the switch 8. An electrical integrating member energized from the more distant sensor 6 serves to close this secondary switch and consequently then only permits switching if a sufficient number of spots or marks on the thread F arrive at the sensor 6.

When employing an electronic switch controlled by a bistable flip-flop circuit as shown in FIG. 2, the locking device can consist of an additional transistor 120 which controls a relay 121, in turn actuating a secondary switch 121a that is serially connected in the collector circuit of the transistor 103. The base of the transistor 120 receives a control voltage from a voltage integrating member consisting of the resistance 122 and a capacitor 123. This member is energized through a capacitor from the lead 8c. The rectifier 124 takes over the rectification of the approaching pulse. As long as no spots or markings pass through the sensor 6, the capacitor 123 is not charged. Consequently, the base of the transistor 120 cannot receive a negative bias through the resistance 122, that is, the transistor 120 remains non-conducting or closed. No current therefore flows through the relay 121 so that the switch contact 121a is open. This opened contact 121a again prevents the bistable multivibrator from switching over since the open transistor 103 also cannot pass a current from the current source 104 through the resistor 106, the transistor 103 and the resistor 110 to the current source 104 because of the open switch 121a. Thus, as long as no spots or markings arrive at the sensor 6, the further application of spots or markings on the thread F thereafter is safely controlled by the sensor 5. Only when several sufficiently rapid pulses have charged the capacitor 123 to such an extent that a sufficient control current reaches the transistor 120, is the transistor 120 opened so that the circuit from the current source 105 through the transistor 120 and the relay 121 and back to the current source 105 is closed. The relay 121 is consequently energized and closes the contact 121a so that the electronic switch 102, 103 can then be actuated.

The aforedescribed locking device also has the advantage that after a break in the thread occurs the spots or marks that had previously been applied vanish and the new initial marking resumes the counting through the sensor 5 at the place where it had stopped at the break in the thread. Thus, if the counting mechanism 9 had counted forty spots of one group up to the time the thread had broken, after an additional ten spots no switching would take place at the sensor 6 since in this case none of the new spots will have arrived at the sensor 6. The next switching at the sensor 6 takes place consequently in this case only after sixty pulses.

The invention, as aforementioned, is not limited to the embodiment shown and described. For example, instead of an electronic switch provided with transistors as shown in FIG. 2, other switches can be used which operate with different contactless switching elements such as electronic tubes, for example. Under certain conditions, it is also equally possible to employ for example an electromagnetically operated mechanical switch instead of an electronic switch.

I claim:
1. The method of measuring the length of a travelling flexible textile element which comprises intermittently applying to the textile element discrete automatically fading markings equidistant from each other in groups of a predetermined number of markings, sensing and simultaneously counting each immediately preceding marking before applying the next succeeding marking to the textile element, sensing the first marking of an immediately preceding group of counted markings after it has travelled a measuring distance that is a multiple of the distance between successive groups of markings and simultaneously applying in response thereto the first marking of the next succeeding group of markings to the textile element.

2. Apparatus for measuring the length of a flexible textile element travelling along a given path, comprising marking means adjacent said path for applying discrete automatically fading markings to said travelling element at a marking point of said path, first and second sensing means located adjacent said path and spaced from said marking point in the travel direction of the element, the distance of said second sensing means from said marking point being a multiple of the distance of said first sensing means from said marking point, switch means normally connecting said first sensing means with said marking means so that said marking means applies a succeeding marking whenever a preceding marking is sensed by said first sensing means, and a counting device connected to said first sensing means and said switch means for counting the markings sensed by said first sensing means and for actuating said switch means after said counting means has counted a group of a predetermined number of markings to connect said second sensing means with said marking means so that said marking means applies a first marking of a succeeding group of markings whenever the first marking of a preceding group of markings is sensed by said second sensing means.

3. Apparatus for measuring the length of a flexible textile element travelling along a given path, comprising marking means adjacent said path for applying discrete automatically fading markings to said travelling element at a marking point of said path, first and second sensing means located adjacent said path and spaced from said marking point in the travel direction of the element, the distance of said second sensing means from said marking point being a multiple of the distance of said first sensing means from said marking point, switch means normally connecting said first sensing means with said marking means so that said marking means applies a succeeding marking whenever a preceding marking is sensed by said first sensing means, a counting device connected to said first sensing means and said switch means for counting the markings sensed by said first sensing means and for actuating said switch means after said counting means has counted a group of a predetermined number of markings to connect said second sensing means with said marking means so that said marking means applies a first marking of a succeeding group of markings whenever the first marking of a preceding group of markings is sensed by said second sensing means, and a locking device controllable by said second sensing means for preventing said counting device from connecting said second sensing means with said marking means whenever said markings have faded before reaching said second sensing means.

4. Apparatus according to claim 3 wherein said switch means comprises an exciter circuit for energizing said marking means to apply a marking to said element, and said locking device includes a switch member in said exciter circuit actuable to interrupt said circuit.

5. Apparatus according to claim 4 including a voltage integrating member electrically connected to said second sensing means and energized by said second sensing means in response to the sensing of the first marking of a group of markings to close said switch member and activate said exciter circuit.

6. Apparatus according to claim 2 wherein said switch means comprises an electronic switch controllable by a bistable flip-flop network for selectively connecting said first and second sensing means with said marking means.

References Cited by the Examiner
UNITED STATES PATENTS

| | | | |
|---|---|---|---|
| 2,488,277 | 11/1949 | Falk et al. | 33—127 X |
| 2,989,690 | 6/1961 | Cook | 73—159 X |

DAVID SCHONBERG, *Primary Examiner.*